(12) United States Patent
DuCharme

(10) Patent No.: US 10,163,099 B2
(45) Date of Patent: Dec. 25, 2018

(54) SYSTEMS AND METHODS FOR PROCESSING ELECTRONIC PAYMENTS USING A GLOBAL PAYMENT DIRECTORY

(71) Applicant: MasterCard International Incorporated, Purchase, NY (US)

(72) Inventor: Brian J. DuCharme, Atlanta, GA (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 14/297,306

(22) Filed: Jun. 5, 2014

(65) Prior Publication Data

US 2014/0289122 A1  Sep. 25, 2014

Related U.S. Application Data

(63) Continuation of application No. 13/682,092, filed on Nov. 20, 2012, now Pat. No. 8,788,421.

(51) Int. Cl.
G06Q 40/00 (2012.01)
G06Q 20/38 (2012.01)
G06Q 20/40 (2012.01)

(52) U.S. Cl.
CPC ....... G06Q 20/3821 (2013.01); G06Q 20/401 (2013.01); G06Q 20/409 (2013.01)

(58) Field of Classification Search
CPC ................................................ G06Q 20/3821
USPC .................................. 705/71, 66, 44, 35, 16
See application file for complete search history.

(56) References Cited

U.S. PATENT DOCUMENTS

| | | | |
|---|---|---|---|
| 6,236,981 B1 | 5/2001 | Hill | |
| 7,454,356 B2 | 11/2008 | Fields et al. | |
| 7,778,903 B2 * | 8/2010 | Weichert et al. | ............... 705/35 |
| 7,849,014 B2 | 12/2010 | Erikson | |
| 7,873,580 B2 | 1/2011 | Hobson et al. | |
| 8,086,493 B2 | 12/2011 | Erikson | |
| 8,190,893 B2 | 5/2012 | Benson et al. | |
| 8,195,517 B2 | 6/2012 | Erikson | |
| 2002/0133467 A1 | 9/2002 | Hobson et al. | |
| 2004/0220857 A1 | 11/2004 | Lapstun et al. | |
| 2007/0011100 A1 | 1/2007 | Libin et al. | |
| 2008/0010217 A1 | 1/2008 | Hobson et al. | |
| 2008/0010220 A1 | 1/2008 | Hobson et al. | |
| 2008/0052183 A1 | 2/2008 | Hobson et al. | |
| 2009/0157556 A1 | 6/2009 | Hobson et al. | |

(Continued)

FOREIGN PATENT DOCUMENTS

| | | |
|---|---|---|
| KR | 20120076586 A | 7/2012 |
| KR | 20120123992 A | 11/2012 |

OTHER PUBLICATIONS

International Search Report and Written Opinion for PCT/US2013/065932 dated Jan. 29, 2014; 11 pages.

Primary Examiner — Samica L Norman
(74) Attorney, Agent, or Firm — Armstrong Teasdale LLP

(57) ABSTRACT

A computer system for use with a memory device for facilitating electronic payments to a payee from an account associated with a payor is provided. Payor profile information is stored in the memory device, which payor profile information is associated with the payor. A token identifier is created which is associated with the payor profile information. The token identifier is transmitted to a payee, for retransmittal of the token identifier by the payee to the computer system during a subsequent transaction between the payor and the payee.

19 Claims, 7 Drawing Sheets

(56) References Cited

U.S. PATENT DOCUMENTS

| | | |
|---|---|---|
| 2009/0157557 A1 | 6/2009 | Hobson et al. |
| 2009/0198617 A1 | 8/2009 | Soghoian et al. |
| 2009/0198618 A1 | 8/2009 | Chan et al. |
| 2010/0065629 A1 | 3/2010 | Wentker et al. |
| 2010/0088191 A1 | 4/2010 | Ku |
| 2010/0241570 A1 | 9/2010 | Keresman, III et al. |
| 2011/0040640 A1 | 2/2011 | Erikson |
| 2011/0153499 A1 | 6/2011 | Felsted et al. |
| 2011/0161233 A1* | 6/2011 | Tieken .................. 705/71 |
| 2011/0208600 A1* | 8/2011 | Aharoni et al. .......... 705/16 |
| 2012/0018511 A1 | 1/2012 | Hammad |
| 2012/0031969 A1 | 2/2012 | Hammad |
| 2012/0039469 A1 | 2/2012 | Mueller et al. |
| 2012/0066080 A1 | 3/2012 | Erikson |
| 2012/0116973 A1 | 5/2012 | Klein et al. |
| 2012/0116976 A1 | 5/2012 | Hammad et al. |
| 2012/0203700 A1 | 8/2012 | Ornce et al. |
| 2012/0221472 A1 | 8/2012 | Erikson |
| 2013/0031006 A1* | 1/2013 | McCullagh et al. ...... 705/66 |

\* cited by examiner

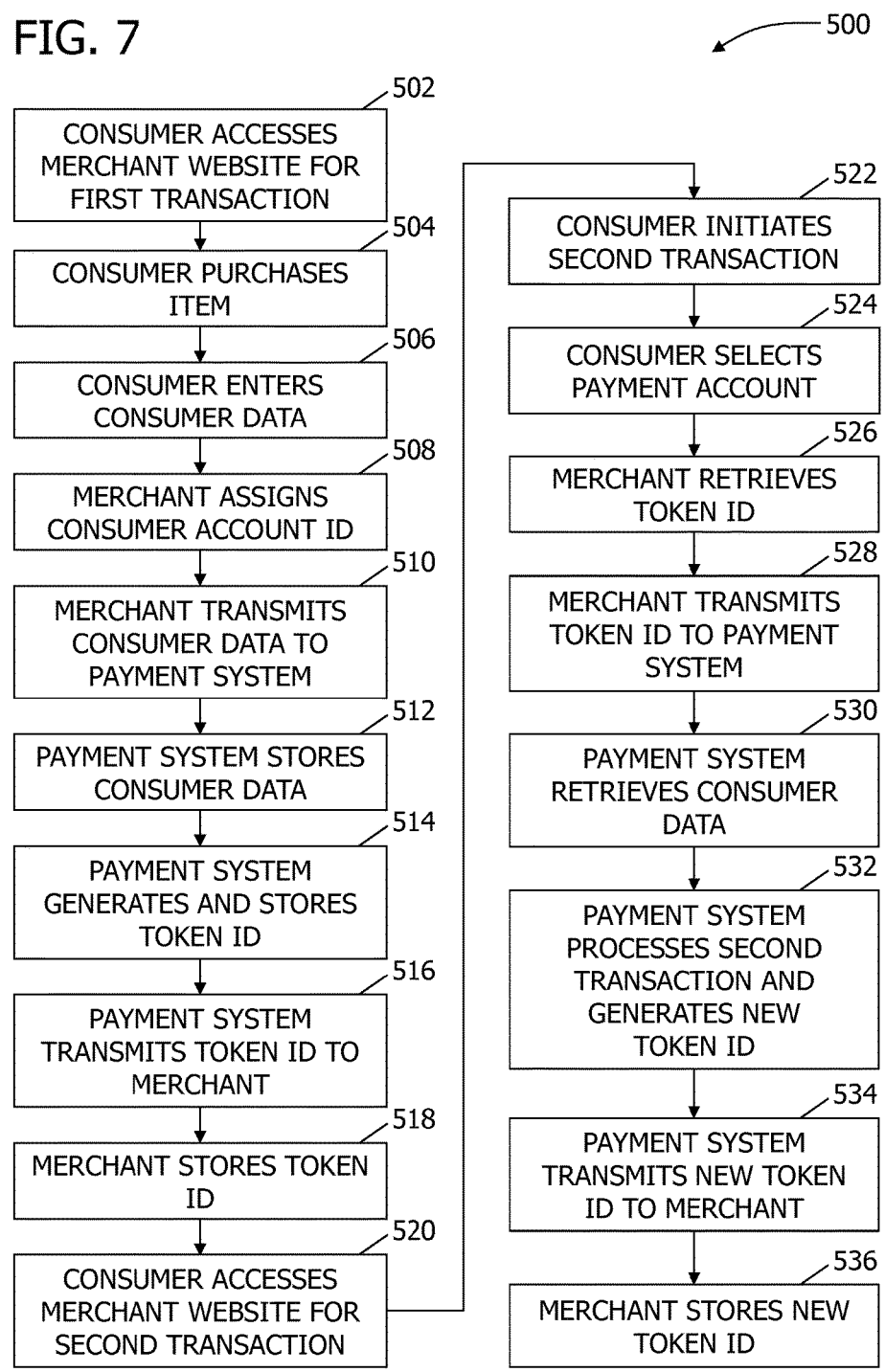

SYSTEMS AND METHODS FOR PROCESSING ELECTRONIC PAYMENTS USING A GLOBAL PAYMENT DIRECTORY

CROSS-REFERENCE TO RELATED APPLICATION

This application is a continuation application of, and claims priority to, U.S. patent application Ser. No. 13/682,092, filed Nov. 20, 2012, which is hereby incorporated by reference in its entirety.

BACKGROUND OF THE INVENTION

The field of the invention relates generally to processing electronic payments in both online and in-person commercial transactions, and more particularly to network-based systems and methods for processing of electronic payments in which payor information must be transmitted amongst various parties for purposes of confirmation of payor information and authorization of payments to be made on behalf of a payor by a bank, transaction card issuer, and the like.

Known electronic payment systems enable users to make payments, for example retail purchases, electronically using a payment card. The payment card is either presented personally, in the situation of a purchase being made at a brick-and-mortar retail facility, or presented electronically, in the form of various items of information associated with the payment card and the underlying account associated with the card. Some known payment systems use a payment network, such as the MasterCard® Network, to transfer payments from users to payees (MasterCard is a registered trademark of MasterCard International, of Purchase, N.Y.).

In the environment of commercial transactions, consumers who use transaction cards to make purchases, particularly in on-line transaction situations, are often required to provide significant amounts of information in order to complete the transaction. For example, consumers are often required to provide their name, address, transaction card information (such as the card number and security code), etc. When entering such information, the merchant website typically requests permission of the consumer to store the consumer's information (registration), which information is typically stored in the merchant's database. Consumers accordingly may over the course of time have their payment and other personal information stored in the databases of numerous merchants. The acquisition and storage, even temporarily, of consumer payment information by numerous merchants and vendors presents a significant challenge with respect to security issues. Merchants and vendors that become participants in such payment systems are typically required by the proprietors of such payment systems to undertake substantial security measures in order to protect data, such as consumer payment information, that is stored on merchant or vendor databases.

Accordingly, it would be desirable to provide a method for receiving and processing consumer payment information that addresses security issues and further reduces the number of locations in which consumer payment information is stored.

BRIEF DESCRIPTION OF THE INVENTION

In one embodiment, a computer-implemented method for facilitating electronic payments to a payee from at least one account associated with a payor is provided, wherein the method is implemented using a computer device coupled to a memory device. The method includes receiving payor profile information from a payee, the payor profile information identifying the at least one account associated with the payor. The method further includes storing the payor profile information in the memory device. The method further includes generating a first token identifier, the first token identifier associated with the payor profile information. The method further includes transmitting the first token identifier to the payee, for storage by the payee. The method further includes receiving the first token identifier from the payee, the first token identifier accompanied by transaction information associated with a transaction between the payor and the payee. The method further includes retrieving the payor profile information associated with the first token identifier. The method further includes authorizing payment to the payee from the payor.

In another embodiment, a computer system for facilitating electronic payments to a payee from at least one account associated with a payor is provided. The computer system includes a processor and a computer-readable storage device having encoded thereon computer-executable instructions. The computer-executable instructions cause the processor to perform functions including receiving payor profile information from a payee, the payor profile information identifying the at least one account associated with the payor. The computer-executable instructions further cause the processor to store the payor profile information in the memory device. The computer-executable instructions further cause the processor to generate a first token identifier, the first token identifier associated with the payor profile information. The computer-executable instructions further cause the processor to transmit the first token identifier to the payee, for storage by the payee. The computer-executable instructions further cause the processor to receive the first token identifier from the payee, the first token identifier accompanied by transaction information associated with a transaction between the payor and the payee. The computer-executable instructions further cause the processor to retrieve the payor profile information associated with the first token identifier. The computer-executable instructions further cause the processor to authorize payment to the payee from the payor.

In yet another embodiment, one or more computer-readable storage media are provided, having computer-executable instructions embodied thereon for facilitating electronic payments to a payee from at least one account associated with a payor. When executed by at least one processor, the computer-executable instructions cause the processor to receive payor profile information from a payee, the payor profile information identifying the at least one account associated with the payor. The computer-executable instructions further cause the processor to store the payor profile information in the memory device. The computer-executable instructions further cause the processor to generate a first token identifier, the first token identifier associated with the payor profile information. The computer-executable instructions further cause the processor to transmit the first token identifier to the payee, for storage by the payee. The computer-executable instructions further cause the processor to receive the first token identifier from the payee, the first token identifier accompanied by transaction information associated with a transaction between the payor and the payee. The computer-executable instructions further cause the processor to retrieve the payor profile information associated with the first token identifier. The computer-executable instructions further cause the processor to authorize payment to the payee from the payor.

BRIEF DESCRIPTION OF THE DRAWINGS

FIG. 7 is a flowchart illustrating an exemplary method for processing electronic payments in accordance with one embodiment of the present invention.

DETAILED DESCRIPTION OF THE INVENTION

Figure 1:
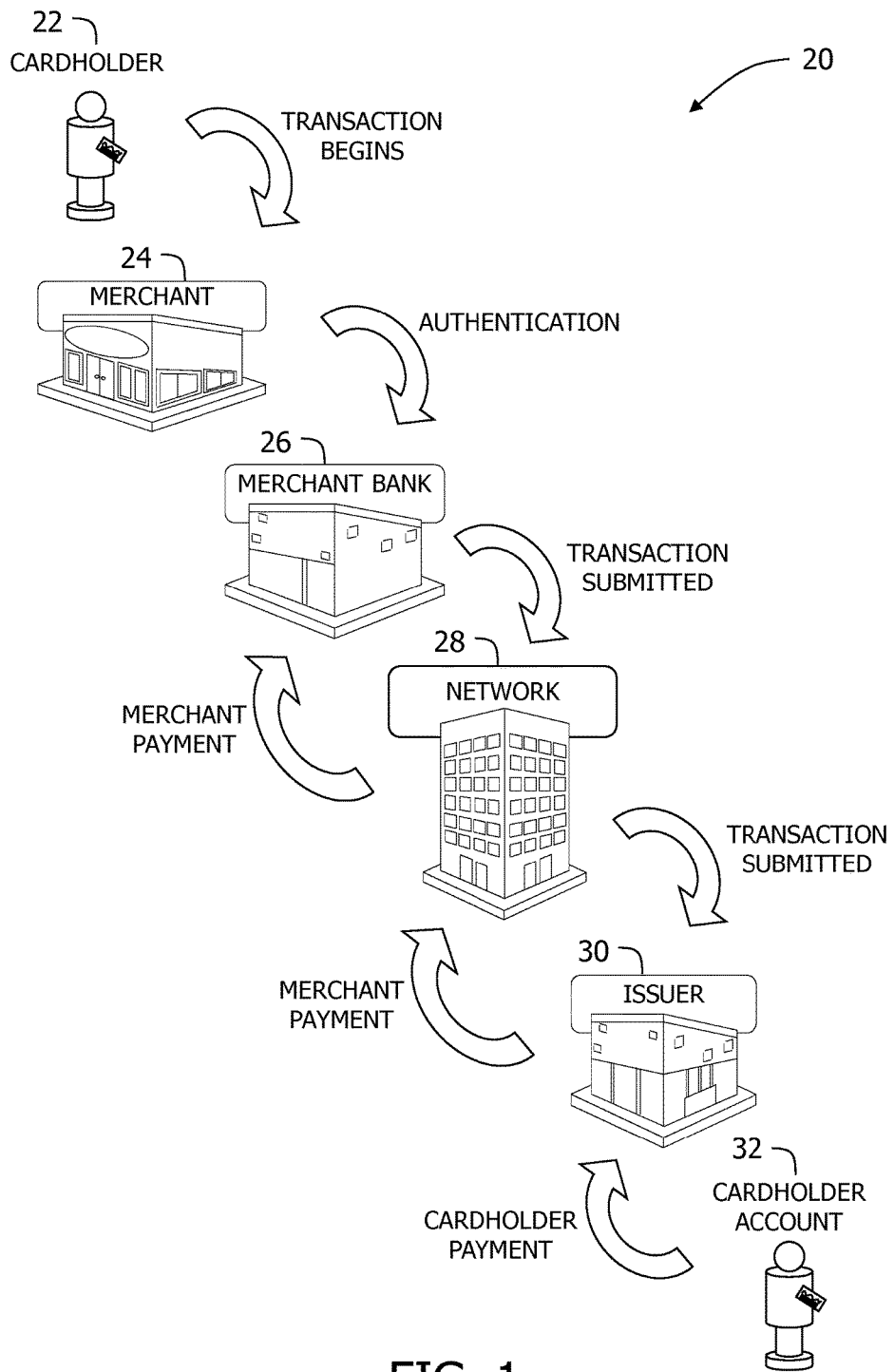
FIG. 1 is a schematic diagram illustrating an exemplary multi-party payment card industry system for enabling ordinary payment-by-card transactions.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

The embodiments described herein relate to electronic financial transactions, specifically, commercial transactions between a consumer (payor) and a merchant (payee), and particularly through online transactions. Described in detail herein are exemplary embodiments of systems and processes that facilitate such electronic payments from an account associated with a payor to an account associated with a payee. The system described herein includes a computer device coupled to a memory device. The computer device and memory device are part of a payment network. A technical effect of the systems and processes described herein is achieved by performing at least one of the following steps: (a) receiving payor profile information from a payee, the payor profile information identifying the at least one account associated with the payor; (b) storing the payor profile information in the memory device; (c) generating a first token identifier, the first token identifier associated with the payor profile information; (d) transmitting the first token identifier to the payee, for storage by the payee; (e) receiving the first token identifier from the payee, the first token identifier accompanied by transaction information associated with a transaction between the payor and the payee; (f) retrieving the payor profile information associated with the first token identifier; (g) authorizing payment to the payee from the payor; (h) generating a second token identifier, the second token identifier associated with the payor profile information; and (i) transmitting the second token identifier to the payee.

In one embodiment, a computer program is provided, and the program is embodied on a computer readable medium. In an exemplary embodiment, the system is executed on a single computer system, without requiring a connection to a server computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The systems and processes are not limited to the specific embodiments described herein. In addition, components of each system and each process can be practiced independent and separate from other components and processes described herein. Each component and process also can be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

FIG. 1 is a schematic diagram 20 illustrating an exemplary multi-party payment card industry system for enabling ordinary payment-by-card transactions in which historical transactions are utilized at least in part with an ensemble aggregate merchant prediction system. As utilized herein, aggregate merchant refers to a high level grouping of merchant locations. More specifically, the various individual merchant locations for a retailer are aggregated together (e.g., linked to one another in a database) to form an aggregate merchant. One merchant location is therefore a component of an aggregate merchant. Typically, an aggregate merchant is utilized when referring to a chain of stores and locations are aggregated together, as further described herein, based on a number of field values stored in a database of transaction data.

The present invention relates to a payment card system, such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a cardholder/consumer 22 tenders payment for a purchase with a payment card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which transactions are settled as a group. Data that is associated with such transactions, as described further herein, is utilized in the art of predicting future purchasing activities.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
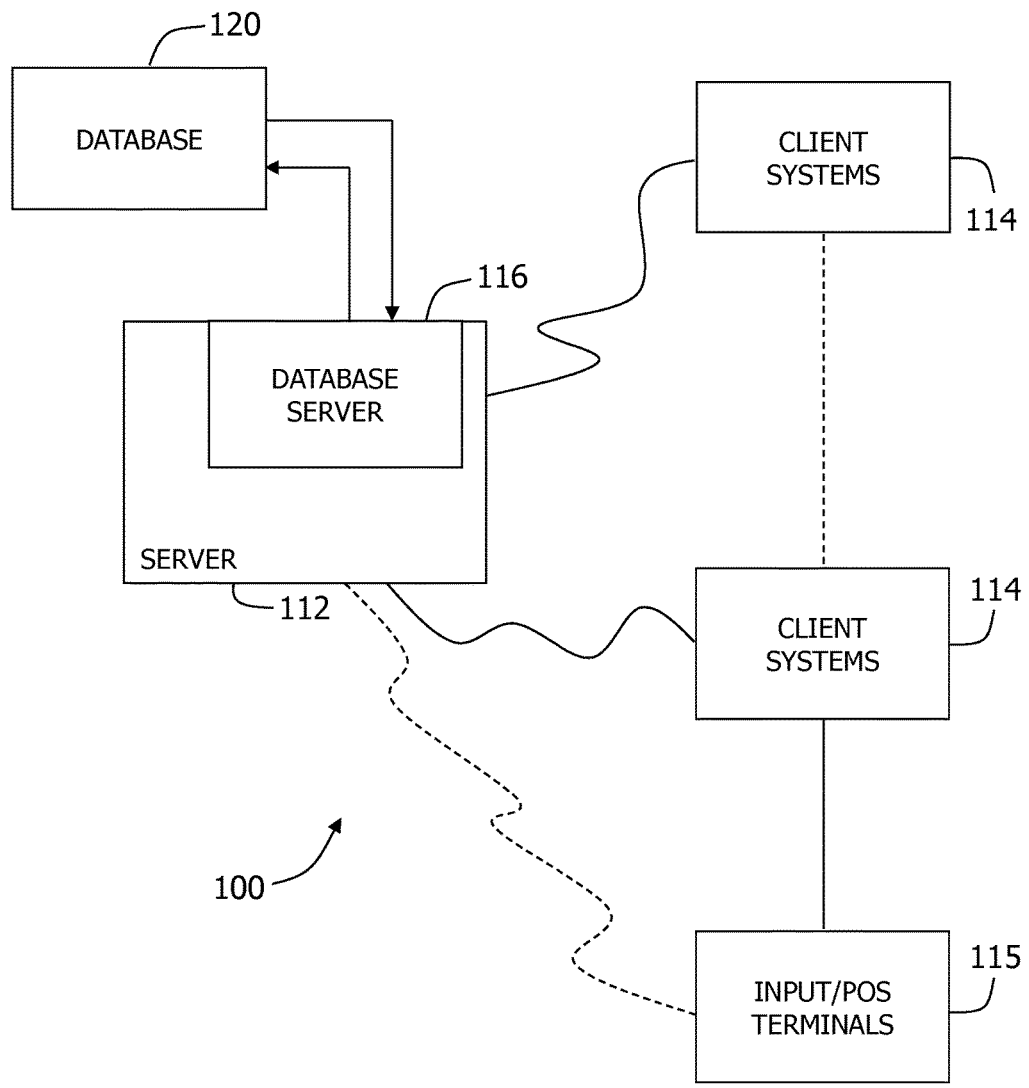
FIG. 2 is a simplified block diagram of a typical server architecture of a system that facilitates processing of electronic payments in accordance with one embodiment of the present invention.

FIG. 2 is a simplified block diagram of an exemplary system 100 in accordance with one embodiment of the present invention. In the exemplary embodiment, system 100 facilitates ensuring that a person attempting to use a transaction card or its corresponding account number is the legitimate cardholder. More specifically, in the exemplary embodiment, system 100 includes a server system 112 communicatively coupled to a plurality of client systems 114, also known as input devices.

In the exemplary embodiment, client systems 114 are computers that include a web browser, which enable client systems 114 to access server system 112 using the Internet. More specifically, client systems 114 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), and a cable modem. Client systems 114 can be any device capable of accessing the Internet including, but not limited to, a desktop computer, a laptop computer, a personal digital assistant (PDA), a cellular phone, a smartphone, or other web-based connectable equipment.

System 100 may also include an input or point-of-sale (POS) terminals 115, for example, a POS terminal and/or a cardholder workstation, which is connected to client systems 114 and may be connected to server system 112. Input terminals 115 may be interconnected to the Internet through a variety of interfaces including a network, such as a LAN or a WAN, dial-in-connections, cellular connections, cable modems, wireless modems, and special high-speed ISDN lines. Input terminals 115 may be any device capable of interconnecting to the Internet to provide transaction card information to client systems 114 and/or server system 112.

A database server 116 is communicatively coupled to a database 120 that contains a variety of information including, but not limited to, a name of a cardholder, an account number, a transaction history, a billing address, a shipping address, the cardholder's date of birth, telephone number(s) associated with the cardholder (e.g., a mobile, work, or home telephone number), email addresses associated with the cardholder, and other cardholder-related information. Moreover, the database 120 can include multiple account numbers associated with a single cardholder. More specifically, a cardholder may be issued multiple transaction cards.

Database 120 may store the multiple transaction card numbers associated with the single cardholder. In addition, each particular account number can have its own corresponding set of information specific to the particular account number. For example, different account numbers can have different shipping addresses associated therewith. In the exemplary embodiment, database 120 is stored remotely from server system 112. In some embodiments, database 120 is decentralized. In the exemplary embodiment, a person can access database 120 via client systems 114 by logging onto server system 112.

In the example embodiment, server system 112 may be associated with an interchange network, and may be referred to as an interchange computer system. Additionally, a check out platform may be associated with the interchange network. Server system 112 may be used for processing transaction data and for registering cardholders and/or merchants into a plurality of programs offered by the interchange network, including, but not limited to, an express check out program. In addition, at least one of client systems 114 may include a computer system associated with an issuer of a transaction card. Accordingly, server system 112 and client systems 114 may be utilized to process transaction data relating to purchases made by a cardholder utilizing a transaction card that is processed by the interchange network and issued by the associated issuer. Another client system 114 may be associated with a user or a cardholder seeking to register, access information, or process a transaction with at least one of the interchange network, the issuer, or the merchant.

Figure 3:
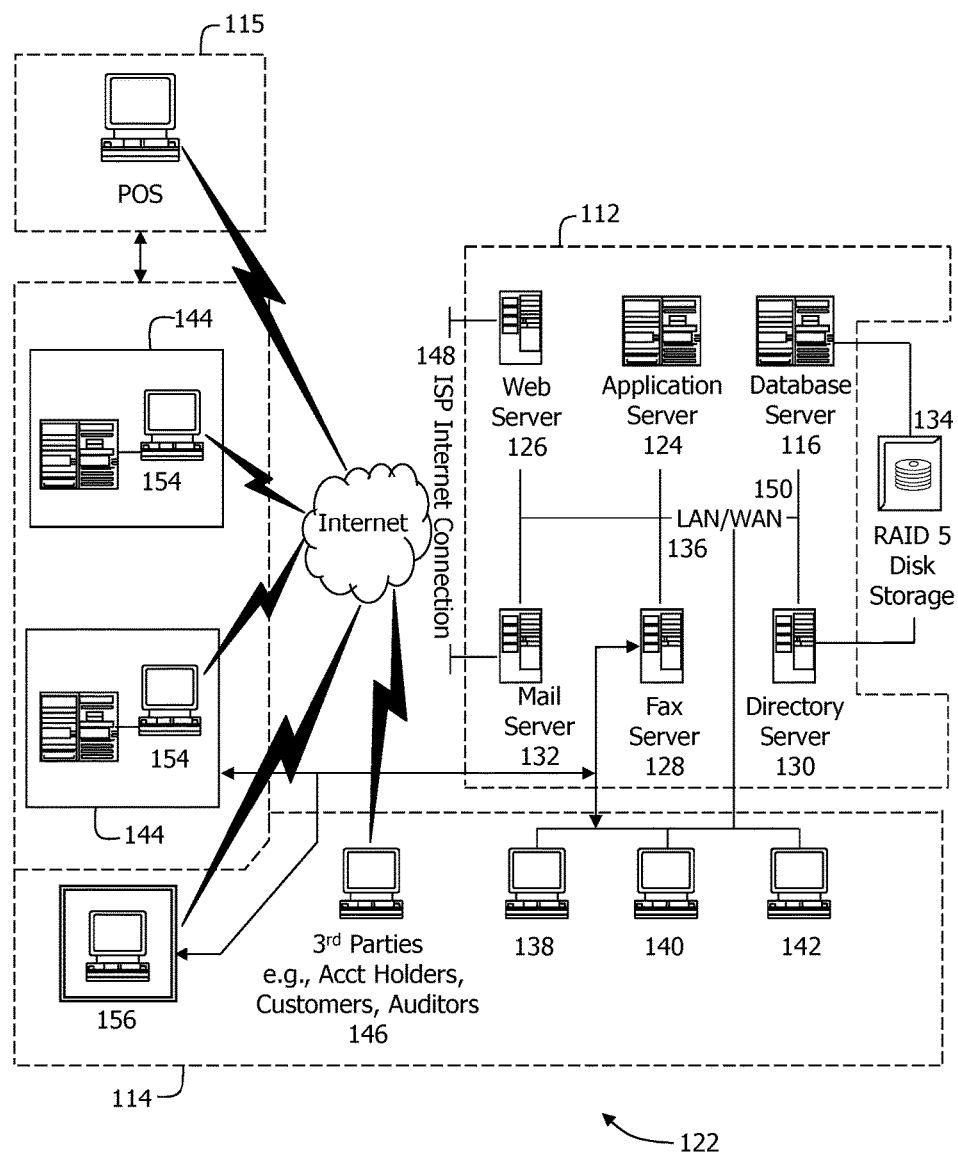
FIG. 3 is an expanded block diagram of the typical system shown in FIG. 2 in accordance with one embodiment of the present invention.

FIG. 3 is an expanded block diagram of an exemplary system 100 in accordance with one embodiment of the present invention. The components of system 100, which are identical to components of system 100 shown in FIG. 2, are identified in FIG. 3 using the same reference numerals as used in FIG. 2. System 100 includes server system 112, client systems 114 and input terminals 115. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other WAN type communication can be utilized in other embodiments, i.e., the systems and methods described herein are not limited to being practiced using the Internet. In addition, and rather than WAN 150, local area network 136 could be used in place of WAN 150.

In the exemplary embodiment, any authorized individual having a workstation 154 can access system 100. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 146 using a telephone link. Fax server 128 is configured to communicate with other workstations 138, 140, and 142 as well.

As used herein, the terms "software" and "firmware" are interchangeable, and include any computer program stored in memory for execution by personal computers, workstations, clients, and servers, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 4:
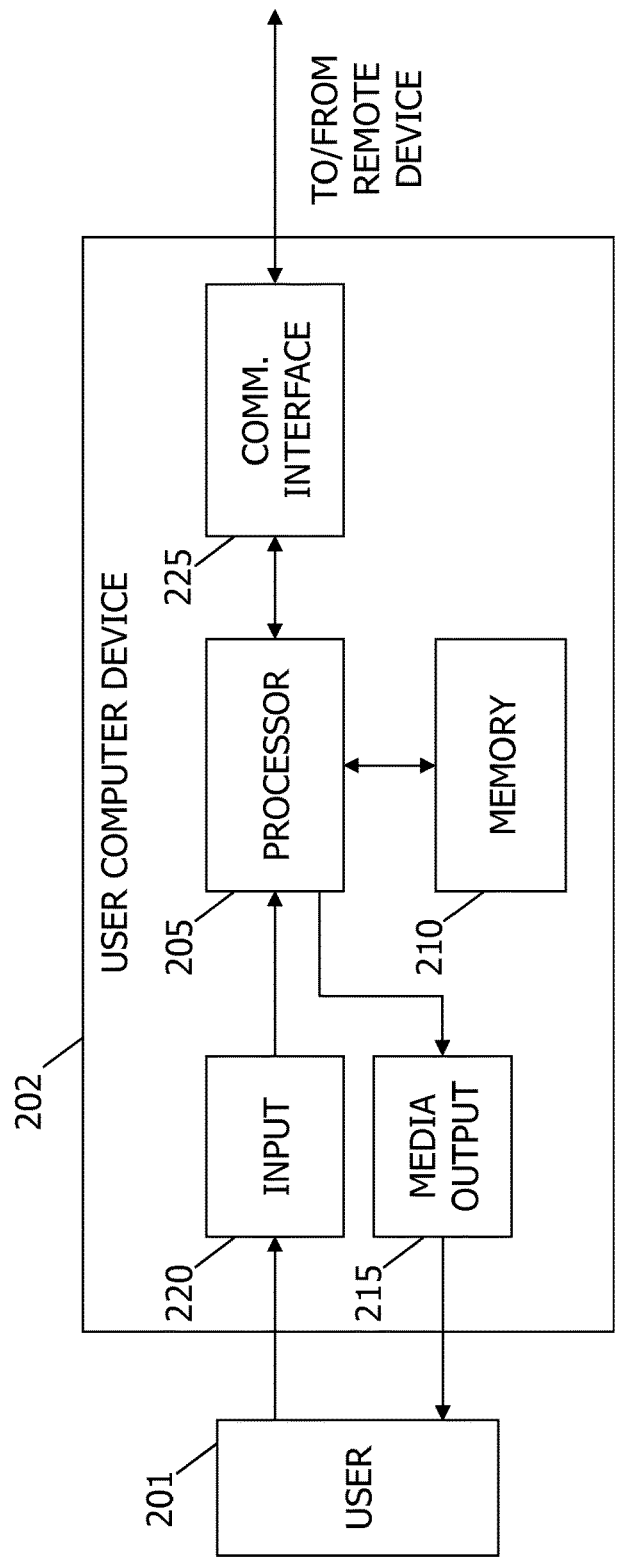
FIG. 4 illustrates an exemplary configuration of a client system shown in FIGS. 2 and 3, in accordance with one embodiment of the present invention.

FIG. 4 illustrates an exemplary configuration of a user computer device 202 operated by a user 201. User computer device 202 may include, but is not limited to, client systems 114, 138, 140, and 142, POS terminals 115, workstation 154, and manager workstation 156.

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or transaction data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter (not shown) such as a video adapter and/or an audio adapter. An output adapter is operatively coupled to processor 205 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 215 is configured to present a graphical user interface (e.g., a web browser and/or a client application) to user 201. A graphical user interface may include, for example, an online store interface for viewing and/or purchasing items, and/or a wallet application for managing payment information.

In some embodiments, user computer device 202 includes an input device 220 for receiving input from user 201. User 201 may use input device 220 to select and/or enter, without limitation, one or more items to purchase, a purchase request, access credential information, and/or payment information. Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

User computer device 202 may also include a communication interface 225, which is communicatively coupleable to a remote device such as server system 112. Communication interface 225 may include, for example, a wired or wireless network adapter and/or a wireless data transceiver for use with a mobile telecommunications network.

Stored in memory area 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website from server system 112. A client application allows user 201 to interact with a server application of a merchant computer system, POS terminals 115, and/or server system 112.

Figure 5:
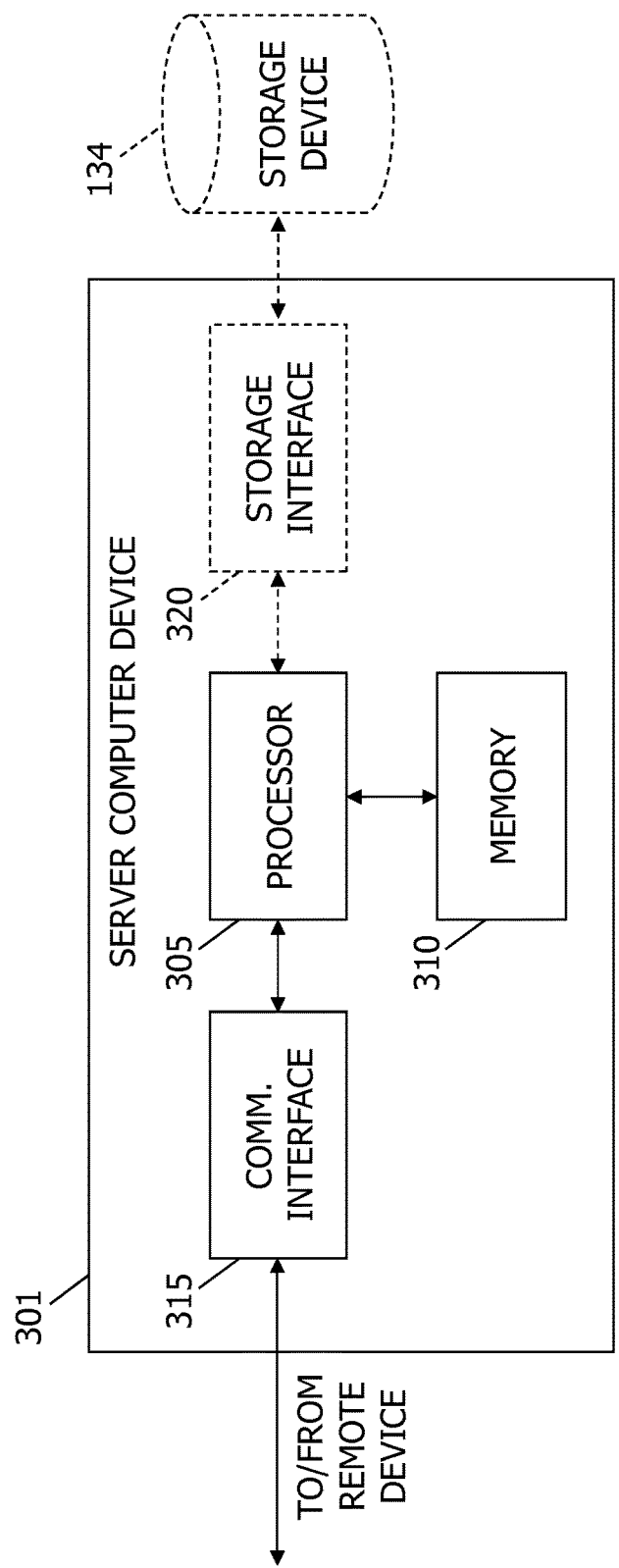
FIG. 5 illustrates an exemplary configuration of a server system shown in FIGS. 2 and 3, in accordance with one embodiment of the present invention.

FIG. 5 illustrates an exemplary configuration of a server computer device 301 such as server system 112 (shown in FIG. 2). Server computer device 301 may include, but is not limited to, a merchant computer system, POS terminals 115, database server 116, application server 124, web server 126, fax server 128, directory server 130, and/or mail server 132.

Server computer device 301 also includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computer device 301 is capable of communicating with a remote device such as user computer device 202 or another server computer device 301. For example, communication interface 315 may receive requests from user computer device 114 via the Internet, as illustrated in FIG. 3.

Processor 305 may also be operatively coupled to a storage device 134. Storage device 134 is any computer-operated hardware suitable for storing and/or retrieving data, such as, but not limited to, data associated with database 120. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks and/or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Figure 6:
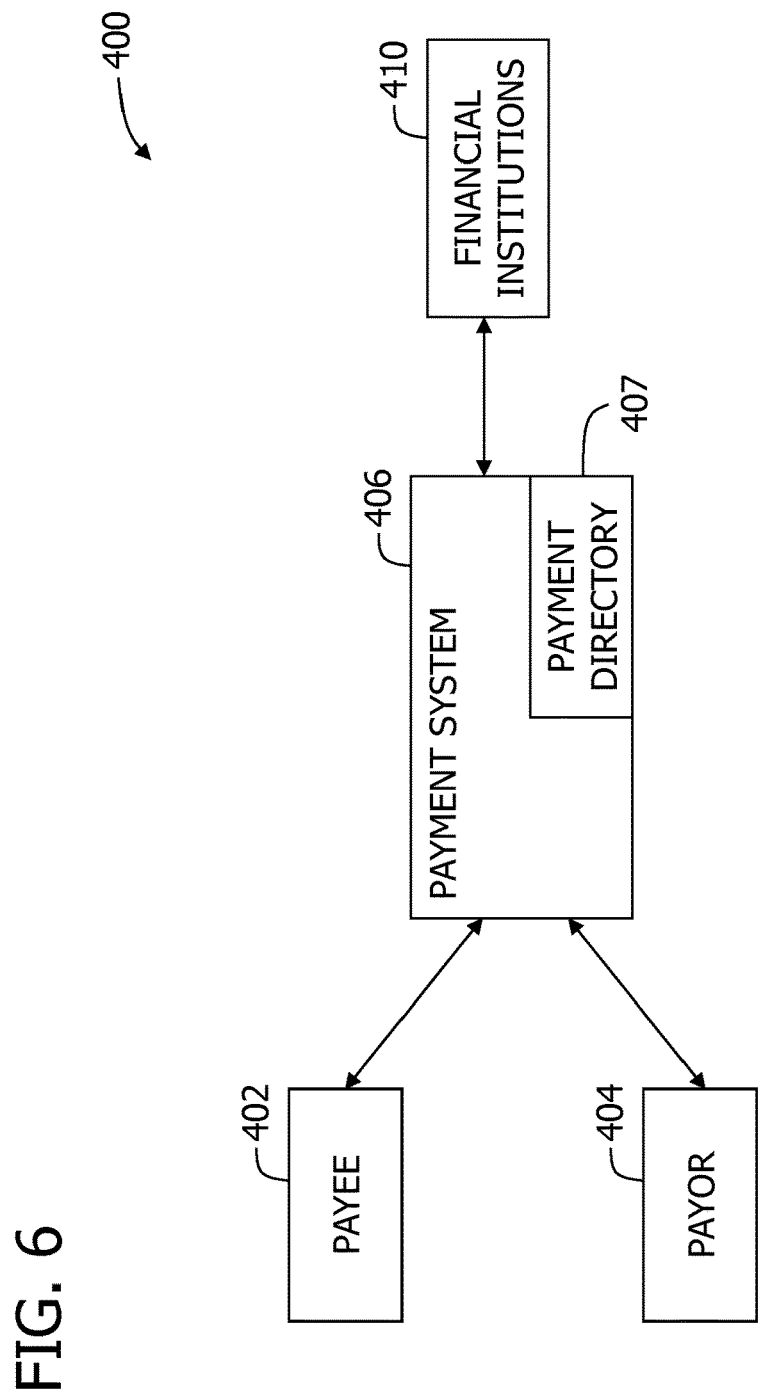
FIG. 6 is a simplified diagram of a consumer-to-merchant payment environment in accordance with one embodiment of the present invention.

FIG. 6 is a simplified block diagram of an environment 400 in which a method 500 for processing electronic payments using a global payment directory is implemented. Environment 400 includes a payee (merchant) 402 and a payor (consumer) 404, both of which are connected (or connectable) to payment system 406, either directly or indirectly, through any of the mechanisms illustrated in FIGS. 1-4 as described herein. Consumer 404 will have associated with it at least one payment source account (or "consumer payment account"), from which payments to merchant 402 will be debited. Payment system 406 preferably additionally communicates with financial institution(s) 410, using the interchange systems as described herein.

In the example embodiment, a payment directory 407 contains a list of payors (consumers), payees (merchants) and their accompanying payment data, or account identifier (s). A representative payment account identifier is, in the case of a payor (consumer) 404, a transaction card account number identifying an account from which funds representing a payment to a payee (merchant) 402 (see FIG. 6) will be debited. Payment directory 407 also contains a list of payee identifiers (e.g., financial institution account numbers into which funds are paid). In the exemplary embodiment, each payor and/or payee identifier has associated with it at least one telephone number, such as a mobile telephone number. The payment directory 407 is stored on payment system 406. Specifically, the payment directory 407 is stored on database 120 (shown in FIG. 2).

FIG. 7 illustrates an exemplary method 500 for facilitating payments using payment system 406. In the exemplary embodiment, during a first online session, consumer 404 accesses 502 a website maintained by merchant 402. Consumer 404 purchases 504 an item (a product or service) through the website, as part of a first transaction. As part of the purchase process, the merchant's website prompts consumer 404 to enter 506 consumer data including personal information (address, etc.) and account data (transaction card number, etc.) in order to complete the purchase (collectively, "payor profile information"). Consumer 404 additionally will be prompted to select, or merchant 402 will assign to consumer 404, log-on identifiers (typically, a username and a password), which merchant 402 uses to recognize consumer 404 during future transactions. Merchant 402 additionally assigns 508 a consumer account identifier ("consumer account ID"), which merchant 402 stores in association with the specific consumer 404 and the specific consumer data provided during the first online session.

Merchant 402 subsequently transmits 510 the specific payor profile information to payment system 406 for completion of the processing of the first transaction between consumer 404 and merchant 402. Payment system 406 stores 512 the specific payor profile information, e.g., in database 120 (shown in FIG. 2). Payment system 406 generates and stores 514 a token identifier ("token ID") associated with the specific consumer data. Payment system 406 then transmits 516 the token ID to merchant 402. Merchant 402 stores 518 the token ID and associates it with the consumer account ID, for use during the next transaction between merchant 402 and consumer 404.

Merchant 402 maintains the consumer account ID confidential and does not communicate it to any third parties, including consumer 404 and payment system 406. In addition, consumer 404 may be permitted to provide account data for more than one consumer payment account to merchant 402. In such a situation, merchant 402 assigns a separate consumer account ID to each separate set of account data, so that a separate consumer account ID is created for each consumer payment account. In addition, merchant 402 prompts consumer 404 to assign a name or code for each consumer payment account that consumer 404 provides to merchant 402. Then, during subsequent transactions between consumer 404 and merchant 402, consumer 404 is able to select from a plurality of accounts from which payments may be made, by selecting amongst a plurality of account "names" presented online by merchant 402. Once merchant 402 has transmitted account data for any specific consumer account, that data is not retained by merchant 402. Rather, merchant 402 merely retains the association between a specific token ID and the corresponding consumer account ID (which is known only to merchant 402), and the association between that consumer account ID and the "name" assigned to the corresponding account by consumer 404.

To begin a second transaction, consumer 404 accesses 520 merchant 402's website (e.g., by entering the previously-assigned username and password) and initiates a second purchase 522 (second transaction). As part of completion of the second transaction, consumer 404 indicates the source of payment, e.g., by selecting 524 amongst one or more account "names," as described above. Merchant 402 retrieves 526 the token ID associated with the consumer account ID (associated with the "name" assigned by the consumer), and transmits 528 the token ID, together with the transaction data, to payment system 406 for completion of the transaction. Payment system 406 retrieves 530 the consumer data associated with the token ID and completes the transaction, using the mechanisms described above. Upon completion of the transaction, payment system 406 generates 532 a new token ID and transmits 534 the new token ID, together with transaction confirmation data, to merchant 402. Merchant 402 stores 536 the new token ID together with the specific consumer account ID, for use as part of a still further future transaction.

In the exemplary embodiment, merchant 402 assigns a consumer account ID to consumer account data, as part of a first transaction. In an alternative embodiment, upon a first visit by consumer 404 to merchant 402's website, consumer 404 is prompted to register and provide consumer data and account data, without having to complete a transaction. Following completion of registration of consumer 404 with merchant 402, merchant 402 transmits the consumer account data to payment system 406 and receives a token ID for use during a first transaction with consumer 402.

In an exemplary embodiment, each time merchant 402 receives a token ID from payment system 406, merchant 402 deletes the prior token ID. In an alternative embodiment, payment system 406 configures each new token ID to prompt the deletion or expiration of any other token IDs stored in merchant 402's database. In another alternative embodiment, each token ID that payment system 406 creates includes expiration information rendering that token ID inactive after retransmission to payment system 406, or after a predefined period of time, or upon occurrence of any other event that will enable method 500 to be performed as described herein. In still another alternative embodiment, payment system 406 simply establishes a new internal rule that prohibits payment system 406 from recognizing or responding to any token ID other than the current, most recently generated token ID, associated with the specific consumer data and account data corresponding to consumer 404. Further, in the exemplary embodiment, each token ID is created by a random number generator, or any other mechanism that enables method 500 to be performed as described. In addition, security measures may be implemented to ensure that merchant 402 has a high confidence level that the token IDs received from payment system 406 originated with payment system 406, and that payment system 406 has a high confidence level that token IDs received from merchant 402 are the tokens created and transmitted to merchant 402 by payment system 406.

The systems and processes are not limited to the specific embodiments described herein. In addition, components of each system and each process can be practiced independent and separate from other components and processes described herein. Each component and process also can be used in combination with other assembly packages and processes.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense. For example, the example embodiments described herein relate to electronic payment for completion of an online transaction between a consumer and a merchant. In an alternative embodiment, the transaction may be at least partially conducted at a merchant's brick-and-mortar facility. In another alternative embodiment, the transaction may be conducted between two merchants. In still another alternative embodiment, the transaction may be conducted between two consumers.

While the invention has been described in terms of various specific embodiments, those skilled in the art will recognize that the invention can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of methods and systems of transacting payor to payee payments provide an improved mechanism for facilitating a transaction but without requiring a merchant or other payor to store sensitive consumer data, and advantageously storing consumer data in a centralized location. As a result, the methods and systems described herein facilitate completion of transactions and performance of electronic payments with increased security.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for electronically processing a transaction between a payee and a payor, the method implemented using a local payee computer device coupled to a memory and in communication with a remote payment network computer device, the method comprising:
   transmitting, by the local payee computer device, payor profile information, including transaction card data for a transaction card associated with the payor, to the remote payment network computer device, the payor profile information identifying an account associated with the payor;
   causing, by the transmission of the payor profile information, the remote payment network computer device to (i) store the payor profile information, (ii) generate a first token identifier, and (iii) transmit the first token identifier to the local payee computer device;
   receiving the first token identifier from the remote payment network computer device, wherein the first token identifier is configured, by a token identifier configuration scheme generated by the remote payment network computer device, to render inactive one or more stored tokens at the local payee computer device;
   storing the first token identifier in the memory;
   causing, by the local payee computer device, the automatic expiration of one or more stored token identifiers based, at least in part, on the token identifier configuration scheme;
   assigning, by the local payee computer device, a consumer account identifier to the payor profile information, wherein the consumer account identifier is distinct from the transaction card data;
   associating, by the local payee computer device, the first token identifier with the consumer account identifier, wherein the first token identifier and the consumer account identifier are stored in the memory and the transaction card data is not stored in the memory;
   transmitting the first token identifier to the remote payment network computer device with transaction information associated with the transaction between the payor and the payee;
   causing, in response to receiving the first token identifier, the remote payment network computer device to (i) process the transaction, (ii) generate a second token identifier, and (iii) transmit the second token identifier to the local payee computer device;
   receiving, by the local payee computer device, the second token identifier associated with the payor;
   associating, by the local payee computer device, the second token identifier with the consumer account identifier, wherein the second token identifier and the consumer account identifier are stored in the memory;
   executing the token identifier configuration scheme, upon receipt of the second token identifier and according to at least one rule of the remote payment network computer device, wherein the token identifier configuration scheme includes at least one of i) instructing the local payee computer device to delete a prior token identifier when a current token identifier is received, ii) configuring each current token identifier to prompt expiration of all prior token identifiers stored at the local payee computer device, iii) rendering a current token identifier expired after a predetermined period of time, and iv) a prohibition at the remote payment network computer device on accepting any token identifier other than the current token identifier; and
   receiving an authorization for the transaction from the remote payment network computer device.

2. The computer-implemented method of claim 1, further comprising storing the first token identifier in association with the transaction card associated with the payor.

3. The computer-implemented method of claim 1, further comprising:
   receiving, from the payee, a selection of a consumer account; and
   retrieving, from the memory, the first token identifier based on the received selection.

4. The computer-implemented method of claim 1, wherein the consumer account identifier is a first consumer account identifier associated with a first consumer account of the payor, said method further comprising:
   storing at least a second consumer account identifier associated with a second consumer account of the payor; and
   storing the received first token identifier with only one of the first consumer account identifier and the second consumer account identifier.

5. The computer-implemented method of claim 1, wherein the consumer account identifier is associated with a consumer account of the payor, said method further comprising prompting the payor to enter a name associated with the consumer account.

6. The computer-implemented method of claim 1, further comprising:
   prompting the payor to provide the payor profile information to the local payee computer device; and
   receiving, by the local payee computer device, the payor profile information from the payor.

7. The computer-implemented method of claim 6, further comprising deleting the payor profile information from the memory after transmitting the payor profile information to the remote payment network computer device.

8. The computer-implemented method of claim 1, further comprising retrieving the first token identifier during at least one subsequent transaction, based at least in part on a previous association between the first token identifier and the consumer account identifier by the payee computer device.

9. The computer-implemented method of claim 1, wherein the first token identifier and the second token identifier are each created by a random number generator.

10. A payee computer device for electronically processing a transaction between a payee and a payor, said payee computer device comprising a processor coupled to a memory and in communication with a remote payment network computer device, said processor configured to:
   transmit payor profile information to the remote payment network computer device, including transaction card data for a transaction card associated with the payor, the payor profile information identifying an account associated with the payor;
   cause, by the transmission of the payor profile information, the remote payment network computer device to (i) store the payor profile information, (ii) generate a first token identifier, and (iii) transmit the first token identifier to the payee computer device;
   receive the first token identifier from the remote payment network computer device, wherein the first token identifier is configured, by a token identifier configuration scheme generated by the remote payment network computer device, to render inactive one or more stored tokens at the payee computer device;

store the first token identifier in the memory;

cause the automatic expiration of one or more stored token identifiers based, at least in part, on the token identifier configuration scheme;

assign a consumer account identifier to the payor profile information, wherein the consumer account identifier is distinct from the transaction card data;

associate the first token identifier with the consumer account identifier, wherein the first token identifier and the consumer account identifier are stored in the memory and the transaction card data is not stored in the memory;

transmit the first token identifier to the remote payment network computer device with transaction information associated with the transaction between the payor and the payee;

cause, in response to receiving the first token identifier, the remote payment network computer device to (i) process the transaction, (ii) generate a second token identifier, and (iii) transmit the second token identifier to the payee computer device;

receive the second token identifier, wherein the second token identifier is associated with the payor;

associate the second token identifier with the consumer account identifier, wherein the second token identifier and the consumer account identifier are stored in the memory;

execute the token identifier configuration scheme, upon receipt of the second token identifier and according to at least one rule of the remote payment network computer device, wherein the token identifier configuration scheme includes at least one of i) instructing the payee computer device to delete a prior token identifier when a current token identifier is received, ii) configuring each current token identifier to prompt expiration of all prior token identifiers stored at the payee computer device, iii) rendering a current token identifier expired after a predetermined period of time, and iv) a prohibition at the remote payment network computer device on accepting any token identifier other than the current token identifier; and receive an authorization for the transaction from the remote payment network computer device.

11. The payee computer device of claim 10, wherein said processor is further configured to store the first token identifier in association with the transaction card associated with the payor.

12. The payee computer device of claim 10, wherein said processor is further configured to:
receive, from the payee, a selection of a consumer account; and
retrieve, from the memory, the first token identifier based on the received selection.

13. The payee computer device of claim 10, wherein the consumer account identifier is a first consumer account identifier associated with a first consumer account of the payor, said processor further configured to:
store at least a second consumer account identifier associated with a second consumer account of the payor; and
store the received first token identifier with only one of the first consumer account identifier and the second consumer account identifier.

14. The payee computer device of claim 10, wherein the consumer account identifier is associated with a consumer account of the payor, said processor further configured to prompt the payor to enter a name associated with the consumer account.

15. The payee computer device of claim 10, wherein said processor is further configured to:
prompt the payor to provide the payor profile information to said payee computer device; and
receive the payor profile information from the payor.

16. The payee computer device of claim 10, wherein said processor is further configured to retrieve the first token identifier during at least one subsequent transaction, based at least in part on a previous association between the first token identifier and the consumer account identifier by the payee computer device.

17. The payee computer device of claim 10, further comprising a random number generator configured to create each of the first token identifier and the second token identifier.

18. One or more non-transitory computer-readable storage media having computer-executable instructions embodied thereon for electronically processing a transaction between a payee and a payor, wherein, when executed by at least one processor of a payee computer device in communication with a remote payment network computer device, the computer-executable instructions cause the processor to:

transmit payor profile information to the remote payment network computer device, including transaction card data for a transaction card associated with the payor, the payor profile information identifying an account associated with the payor;

cause, by the transmission of the payor profile information, the remote payment network computer device to (i) store the payor profile information, (ii) generate a first token identifier, and (iii) transmit the first token identifier to the payee computer device;

receive the first token identifier from the remote payment network computer device, wherein the first token identifier is configured, by a token identifier configuration scheme generated by the remote payment network computer device, to render inactive one or more stored tokens at the payee computer device;

store the first token identifier in the memory;

cause the automatic expiration of one or more stored token identifiers based, at least in part, on the token identifier configuration scheme;

assign a consumer account identifier to the payor profile information, wherein the consumer account identifier is distinct from the transaction card data;

associate the first token identifier with the consumer account identifier, wherein the first token identifier and consumer account identifier is stored in the memory and wherein the transaction card data is not stored;

transmit the first token identifier to the remote payment network computer device with transaction information associated with the transaction between the payor and the payee;

cause, in response to receiving the first token identifier, the remote payment network computer device to (i) process the transaction, (ii) generate a second token identifier, and (iii) transmit the second token identifier to the payee computer device;

receive the second token identifier, wherein the second token identifier is associated with the payor;

associate the second token identifier with the consumer account identifier, wherein the second token identifier and consumer account identifier or stored in the memory;

execute the token identifier configuration scheme, upon receipt of the second token identifier and according to at least one rule of the remote payment network computer device, wherein the token identifier configuration scheme includes at least one of i) instructing the payee computer device to delete a prior token identifier when a current token identifier is received, ii) configuring each current token identifier to prompt expiration of all prior token identifiers stored at the payee computer device, iii) rendering a current token identifier expired after a predetermined period of time, and iv) a prohibition at the remote payment network computer device on accepting any token identifier other than the current token identifier; and receive an authorization for the transaction from the remote payment network computer device.

19. The non-transitory computer-readable storage media of claim 18, wherein the first token identifier and the second token identifier are each created by a random number generator.

\* \* \* \* \*